United States Patent
Sigler et al.

(10) Patent No.: US 11,772,416 B2
(45) Date of Patent: Oct. 3, 2023

(54) SYSTEM FOR DETECTION OF NON-PNEUMATIC TIRE LOADING

(71) Applicant: The Goodyear Tire & Rubber Company, Akron, OH (US)

(72) Inventors: Wesley Glenn Sigler, Barberton, OH (US); Joseph Carmine Lettieri, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 588 days.

(21) Appl. No.: 17/063,770

(22) Filed: Oct. 6, 2020

(65) Prior Publication Data

US 2022/0105747 A1  Apr. 7, 2022

(51) Int. Cl.
*B60C 7/14* (2006.01)
*B60B 9/26* (2006.01)
*B60C 19/00* (2006.01)

(52) U.S. Cl.
CPC ............. *B60B 9/26* (2013.01); *B60C 7/146* (2021.08); *B60C 19/00* (2013.01); *B60C 2019/004* (2013.01)

(58) Field of Classification Search
CPC .... B60C 7/00; B60C 7/10; B60C 7/14; B60C 7/143
See application file for complete search history.

(56) References Cited

U.S. PATENT DOCUMENTS

| 10,749,242 | B2 | 8/2020 | Fenkanyn et al. | |
|---|---|---|---|---|
| 2012/0067481 | A1* | 3/2012 | Cron | B60C 7/18 |
| | | | | 152/326 |
| 2016/0089935 | A1 | 3/2016 | Iwamura et al. | |
| 2017/0080756 | A1 | 3/2017 | Van Riper et al. | |
| 2017/0368879 | A1 | 12/2017 | Lettieri et al. | |
| 2019/0154491 | A1 | 5/2019 | Bunner et al. | |
| 2020/0055339 | A1 | 2/2020 | Van Riper et al. | |
| 2020/0156409 | A1 | 5/2020 | Huang et al. | |

FOREIGN PATENT DOCUMENTS

| CN | 111152603 A | 5/2020 |
|---|---|---|
| CN | 111319398 A | 6/2020 |
| CN | 111532089 A | 8/2020 |
| JP | 2015137851 A | 7/2015 |
| WO | 2016009601 A1 | 1/2016 |

OTHER PUBLICATIONS

Extended European search report received by applicant dated Feb. 23, 2022.

* cited by examiner

*Primary Examiner* — Justin R Fischer

(74) *Attorney, Agent, or Firm* — June E. Rickey; Edward T. Kennedy (57) ABSTRACT

A system for detection of non-pneumatic tire loading includes a non-pneumatic tire. The non-pneumatic tire includes a ground-contacting annular tread, a central rim, and at least one spoke disk disposed between the rim and the tread. The spoke disk includes an inner ring mounted on the central rim, an outer ring, and spokes extending radially between the inner ring and the outer ring. A shear band is disposed between the outer ring of the spoke disk and the tread. A flange is disposed on an outboard surface of the spokes of the spoke disk. Indicating means are formed on the outboard surface of the plurality of spokes of the spoke disk radially outwardly of the flange. The flange interfaces with the indicating means when the tire is in an overloaded state or is in need of replacement.

13 Claims, 8 Drawing Sheets

SYSTEM FOR DETECTION OF NON-PNEUMATIC TIRE LOADING

FIELD OF THE INVENTION

The invention relates to non-pneumatic tires. More particularly, the invention relates to measurement of the conditions or the state of a non-pneumatic tire. Specifically, the invention is directed to a system for detection of the loading of a non-pneumatic tire to determine if the tire is overloaded or nearing the end of its useful life.

BACKGROUND OF THE INVENTION

In the prior art, pneumatic tires have been widely employed. Such tires include a pair of beads that are mounted on a rim. Each one of pair of sidewalls extends from a respective bead to a ground-engaging tread. The rim, sidewalls and tread define an interior that is inflated with air.

In order to address issues associated with prior art pneumatic tires, such as the maintenance of air pressure, non-pneumatic tires have been developed. Non-pneumatic tires are designed to operate without air in an interior cavity. Many types of non-pneumatic tires include a polymer webbing that extends between a rim, which is typically formed of steel or other metal, and a ground-engaging tread. The polymer webbing is flexible and deflects as the tire operates to absorb and/or distribute forces.

If the non-pneumatic tire is overloaded, the polymer webbing may deflect excessively, which in turn may damage the webbing and/or other components of the tire. In addition, as the non-pneumatic tire ages, physical characteristics of the polymer webbing may deteriorate, again leading to damage of the webbing and/or other components of the tire when the tire is loaded during operation.

As a result, there is a need in the art for a system that detects loading of a non-pneumatic tire to determine if the tire is overloaded or nearing the end of its useful life.

SUMMARY OF THE INVENTION

According to an aspect of an exemplary embodiment of the invention, a system for detection of non-pneumatic tire loading includes a non-pneumatic tire. The non-pneumatic tire includes a ground-contacting annular tread, a central rim, at least one spoke disk disposed between the rim and the tread, in which the spoke disk includes an inner ring mounted on the central rim, an outer ring, and a plurality of spokes extending radially between the inner ring and the outer ring, and a shear band is disposed between the outer ring of the spoke disk and the tread. A flange is disposed on an outboard surface of the plurality of spokes of the spoke disk. Indicating means are formed on the outboard surface of the plurality of spokes of the spoke disk radially outwardly of the flange. The flange interfaces with the indicating means when the tire is in an overloaded state or is in need of replacement.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

It is to be understood that the term axially or axial direction refers to the direction that extends parallel to the axis of rotation of the tire, the term radially or radial direction refers to the direction that extends perpendicular to the axis of rotation to the tire, and the term circumferentially or circumferential direction refers to the direction that extends parallel to the direction of rotation of the tire. In addition, the term outboard refers to the axial outer surface of the tire as mounted on a vehicle, and the term inboard refers to the axial inner surface of the tire as mounted on the vehicle.

An exemplary embodiment of a system for detection of non-pneumatic tire loading is shown in FIGS. 1 through 8 and is indicated generally at 50. Turning to FIGS. 1 through 5, the system 50 includes a non-pneumatic tire 10. The non-pneumatic tire 10 includes a radially outer ground engaging tread 12, a shear band 14, one or more spoke disks 18, and a central rim 20. The tread 12 may include a plurality of longitudinally-oriented grooves which in turn form longitudinal tread ribs therebetween. The ribs may be further divided transversely or longitudinally by grooves to form a tread pattern adapted to the particular design and/or use requirements of the tire 10. The tread grooves may have any depth consistent with the intended use of the tire, and the tread 12 may include elements such as ribs, blocks, lugs, grooves, and sipes as desired to improve the performance of the tire 10 in various conditions.

The shear band 14 preferably is annular and is located radially inward of the tread 12 and radially outward of the spoke disks 18. The spoke disks 18 may include different configurations. An exemplary configuration for each spoke disk 18 includes a plurality of spokes 22 that extend radially between an inner ring 24 and an outer ring 26. Each spoke 22 may include at least one radially inward spoke member 28 that intersects with at least one radially outward spoke member 30 at a joint 32.

Preferably, the tire 10 includes at least two (2) of the spoke disks 18, and up to eight (8) of the spoke disks. More preferably, the tire 10 includes between two (2) and four (4) of the spoke disks 18. The tire 10 may include different combinations of spoke disks 18, different constructions of the spoke disks, and different rotational orientations of the spoke disks relative to one another, as dictated by specific design considerations.

In this manner, the non-pneumatic tire 10 includes the central rim 20 with spoke disks 18 disposed concentrically and axially along an outer surface 34 of the rim. The spoke disks 18 preferably engage the rim 20 via an adhesive bond between a radially innermost surface 36 of each spoke disk and the radially outer surface 34 of the rim 20. The shear band 14 is disposed concentrically over the axially disposed spoke disks 18. The shear band 14 preferably engages the spoke disks 18 via an adhesive bond between a radially innermost surface 38 of the shear band 14 and a radially outermost surface 40 of each spoke disk 18. The tread 12 radially overlays the shear band 14 and preferably is bonded to the shear band via co-curing of the elastomer compositions.

Figure 1:
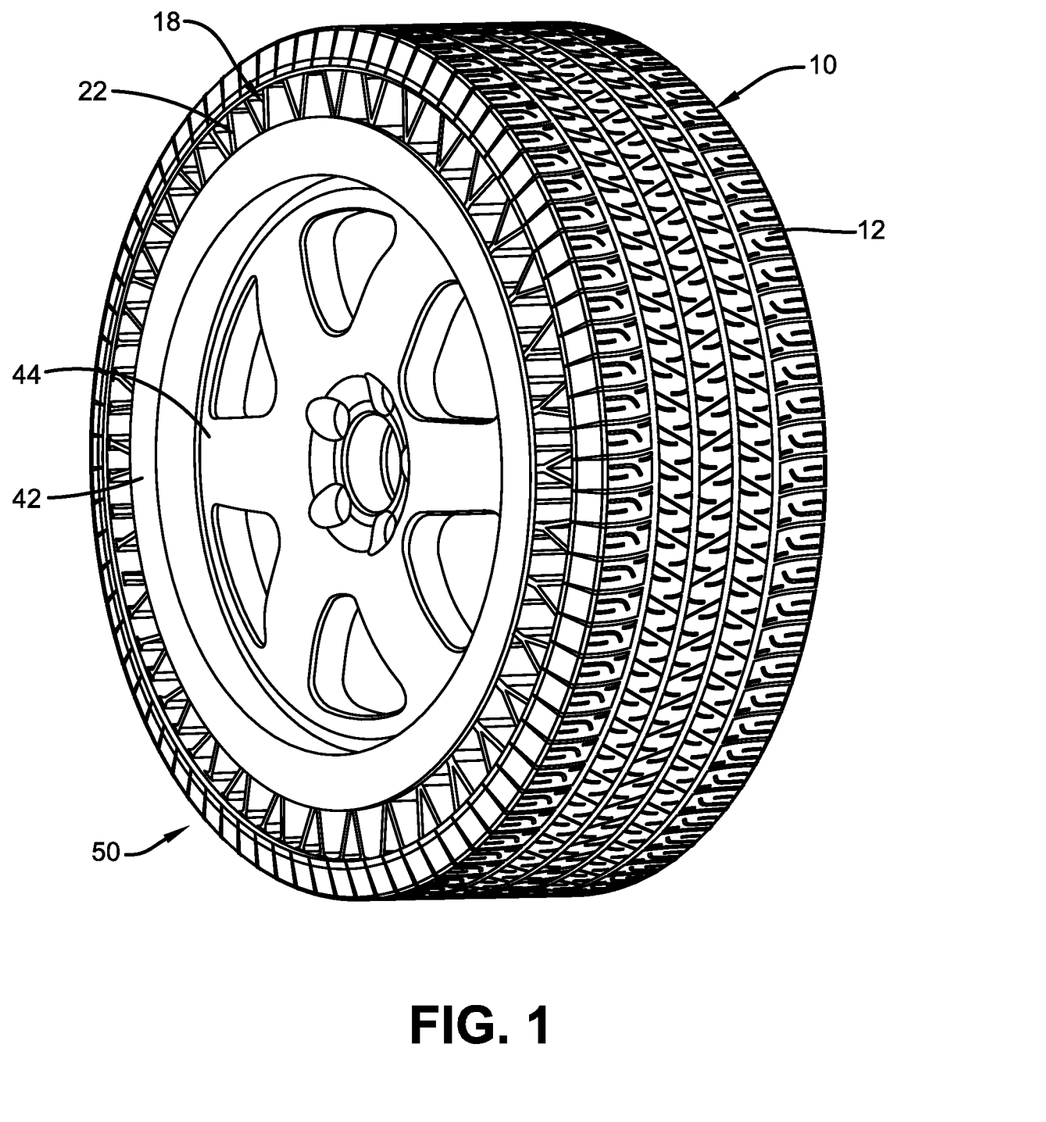
FIG. 1 is a perspective view of an exemplary embodiment of a system for detection of non-pneumatic tire loading.
Figure 2:
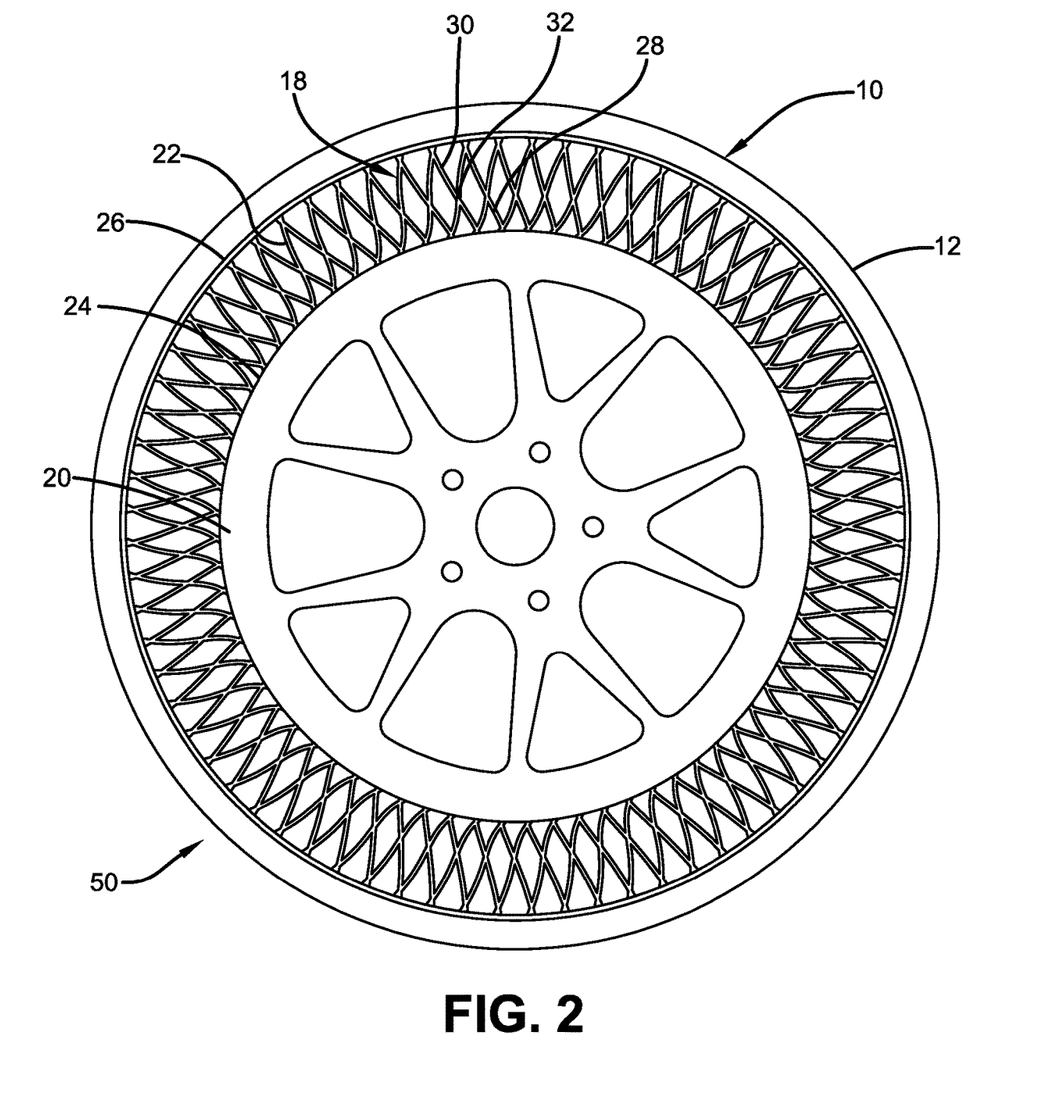
FIG. 2 is an elevational view of a portion of the system shown in FIG. 1.
Figure 3:
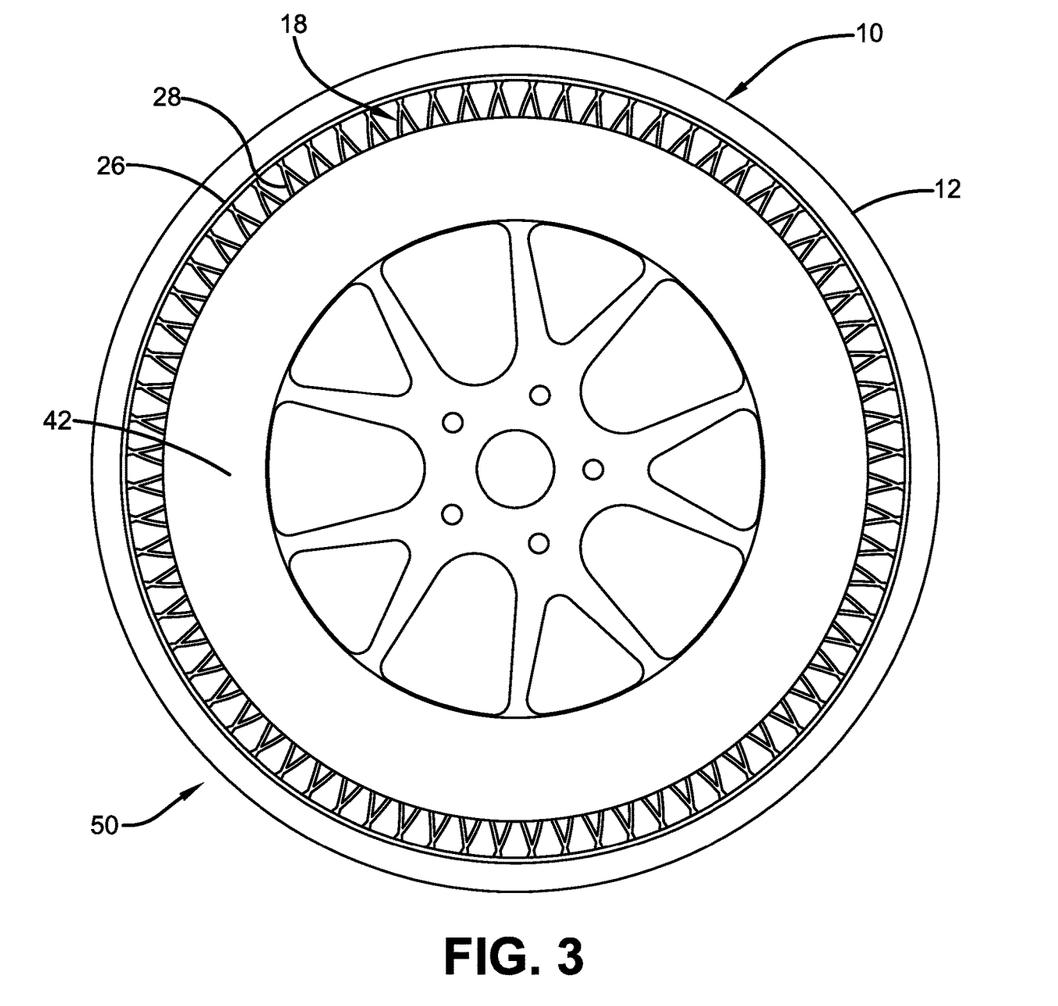
FIG. 3 is an elevational view of an additional portion of the system shown in FIG. 1.
Figure 4:
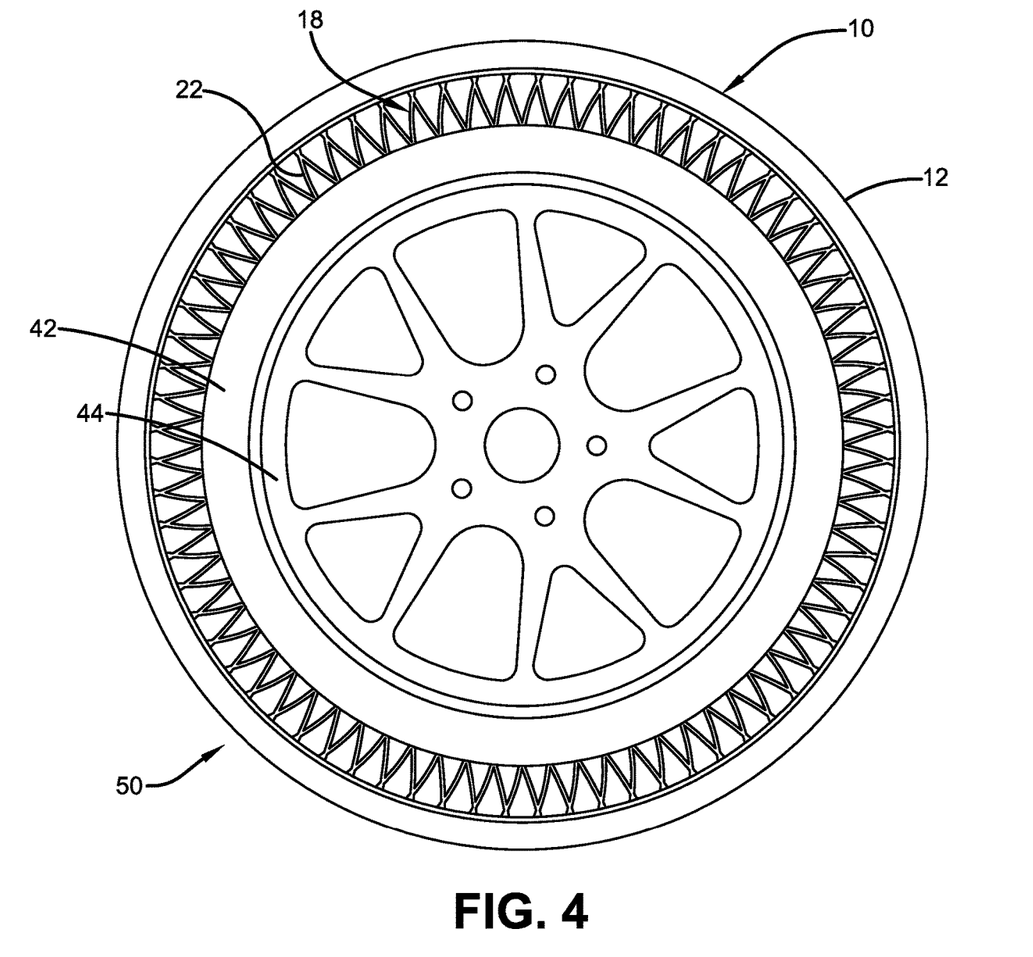
FIG. 4 is an elevational view of the system shown in FIG. 1.
Figure 5:
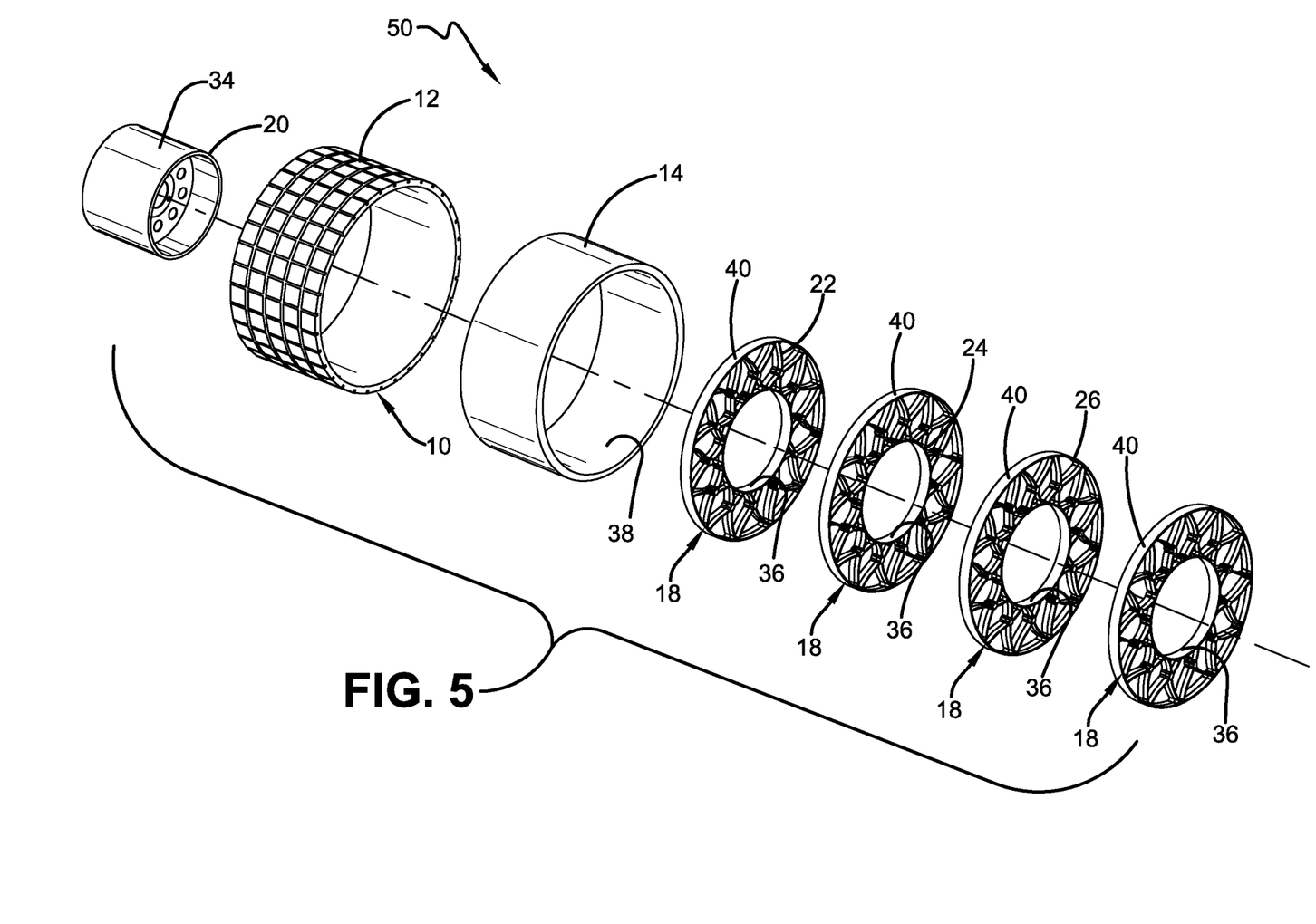
FIG. 5 is an exploded view of a portion of the system shown in FIG. 1.

Preferably, a flange disc 42 is disposed on an outboard surface 52 (FIG. 6) of the spokes 22 of an outboard spoke disk 18, and a hubcap 44 is disposed outboardly of the flange to secure the flange to the rim 20 and provide a cover on the outboard side of the outboard spoke disk. The flange 42 and the hubcap 44 may be two separate components, or may be a single integrated component.

The non-pneumatic tire 10 is more fully described in U.S. Patent Application Publication Number 2017/0368879, which is owned by the same Assignee as the present invention, the Goodyear Tire & Rubber Company, and is hereby incorporated by reference.

Figure 6:
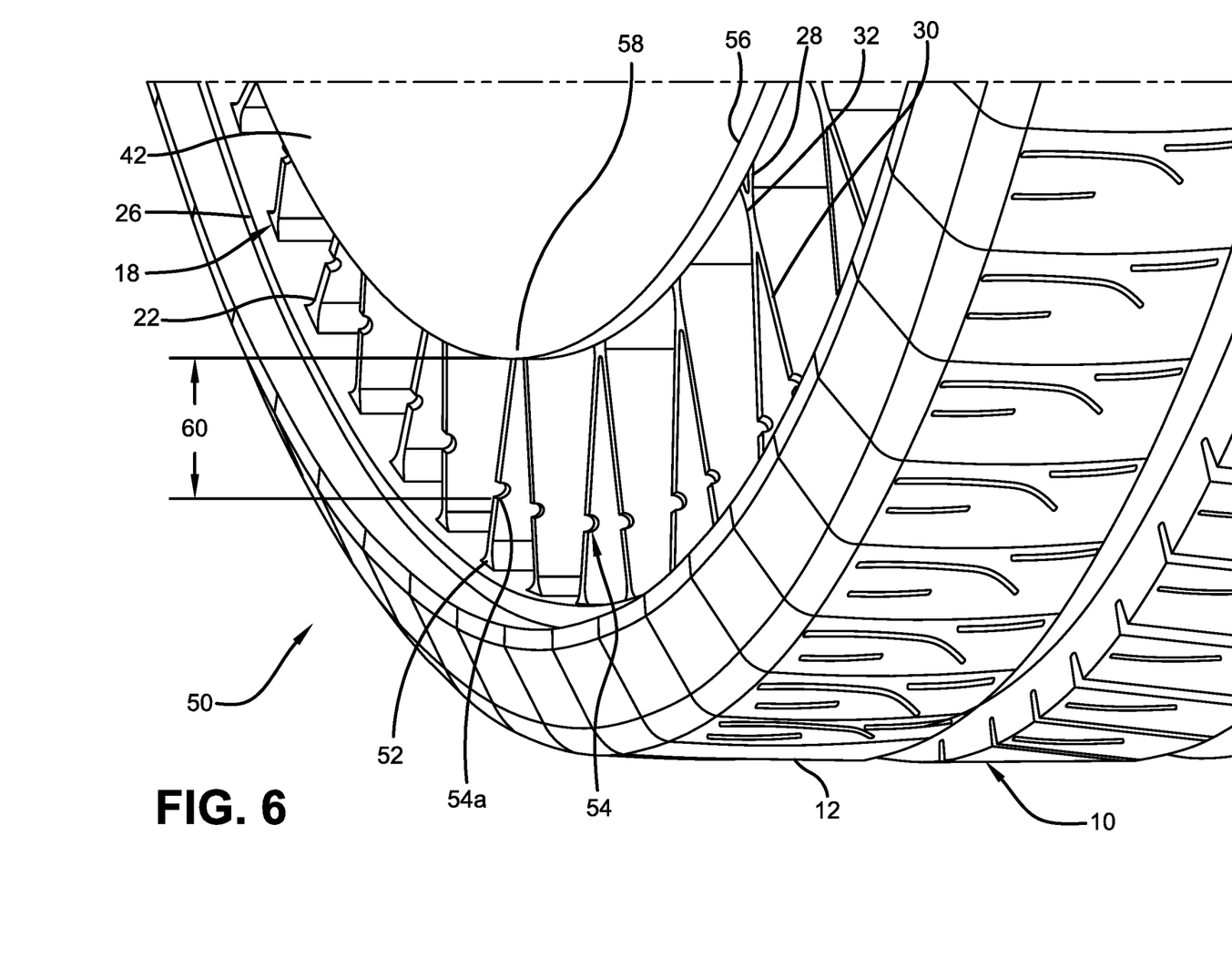
FIG. 6 is an enlarged fragmentary perspective view of a portion of the system shown in FIG. 1.
Figure 7:
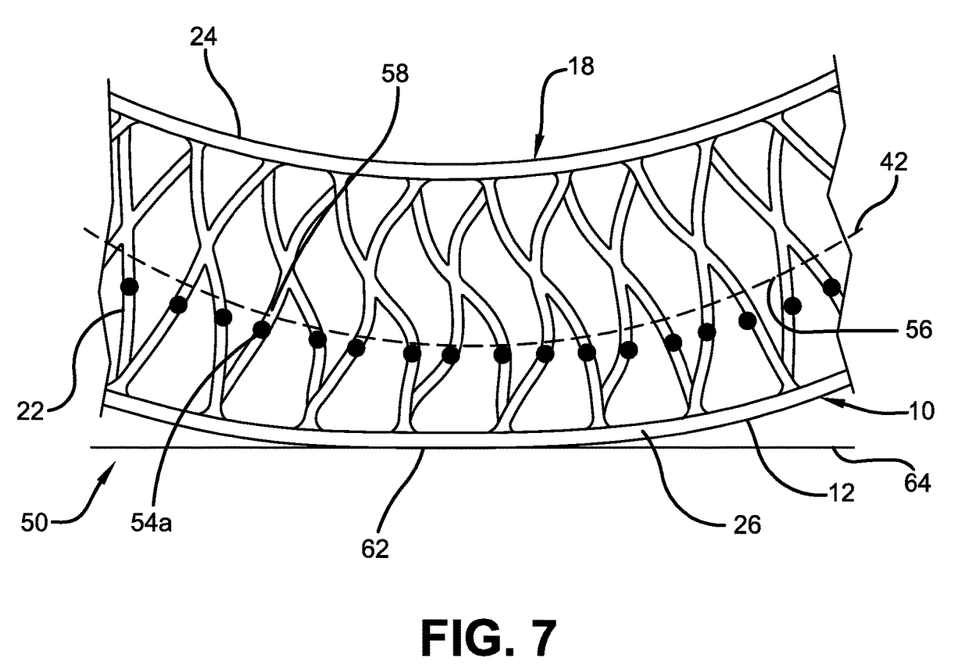
FIG. 7 is a fragmentary schematic representation of a portion of a spoke disc of the system shown in FIG. 1.

Referring now to FIGS. 6 and 7, the system 50 includes features integrated into the tire 10 for detection of tire loading. For example, the system 10 may incorporate visual indicators. More particularly, selected spokes 22 on the outboard spoke disk 18 include an outboard surface 52. Indicating means 54 may be formed on or in the outboard surface 52 of the selected spokes 22 radially outwardly of the flange 42. A first example of the indicating means 54 includes features 54a formed in the outboard surface 52 of the selected spokes 22. The features 54a are shown as notches and will be referred to as notches for the purpose of convenience, but may also be formed as protrusions. While the notches 54a may be formed anywhere along the outboard surface 52 of the selected spokes 22, a preferred location is in the radially outward member 30 of the selected spokes.

In the system 50, the flange 42 includes an outer perimeter 56. A radial distance 60 extends between the flange perimeter 56 and a selected notch 54a. A point 58 along the flange perimeter 56 is closest to a respective one of the notches 54a. In this manner, each notch 54a will have a respective point 58 along the flange perimeter 56. A radial distance 60 is formed between each notch 54a and its respective point 58 along the flange perimeter 56.

As shown in FIG. 7, as the tire 10 is loaded, a contact patch or footprint 62 is formed, which is the portion of the tread 12 that contacts the ground 64 during a given instant in time. Loading forces on the tire 10 tend to cause the spokes 22 proximate the footprint 62 to compress, thereby decreasing the radial distance 60 between selected notches 54a and their respective points 58 along the flange perimeter 56. When the tire 10 is in a proper loading state, that is, it is not overloaded or not in need of replacement, each notch 54 remains visible. When the tire 10 is overloaded or in need of replacement, the radial distance 60 is eliminated by compression of the spokes 22, so that the notch 54a is either partially covered or completely covered by the flange 42.

Thus, the system 50 provides an indicator in which the distance 60 between at least one selected notch 54a and its respective point 58 on the flange 42 is eliminated when the tire 10 is overloaded. When the selected notch 54a is covered by the flange 42 and thus is not visible, the vehicle on which the tire 10 is installed can be unloaded until all of the notches are again visible, thereby returning the tire to a proper loading state. The system 50 also provides an indicator in which the distance 60 between at least one selected notch 54a and its respective point 58 on the flange 42 is eliminated when the tire 10 is nearing the end of its useful life. When the selected notch 54a is covered by the flange 42 and is not visible, the tire 10 can then be replaced.

Alternatively, the indicating means 54 may include other visual indicators such as one or more dots formed on the outboard surface 52 of the selected spokes 22 with a color that contrasts with the color of the spokes. As described above, when the tire 10 is overloaded or nearing the end of its life, the radial distance 60 is eliminated, so that one or more of the dots are either partially covered or completely covered by the flange 42. When the selected dot is not visible, the vehicle on which the tire 10 is installed can be unloaded until all of the dots are again visible, thereby returning the tire to a proper loading state, or the tire can be replaced.

As an additional alternative, the system 10 may incorporate an audio indicator. For example, the indicating means 54 for an audio indicator may include one or more protrusions formed on the outboard surface 52 of the selected spokes 22 radially outwardly of the flange 42, and which project axially outwardly. As described above, when the tire 10 is overloaded or nearing the end of its life, the radial distance 60 is eliminated, so that one or more of the protrusions contact the flange 42, thereby emitting a sound to provide an audio signal during operation of the tire. When the audio signal is generated, the vehicle on which the tire 10 is installed can be unloaded until the signal is no longer emitted, thereby returning the tire to a proper loading state, or the tire can be replaced.

Figure 8:
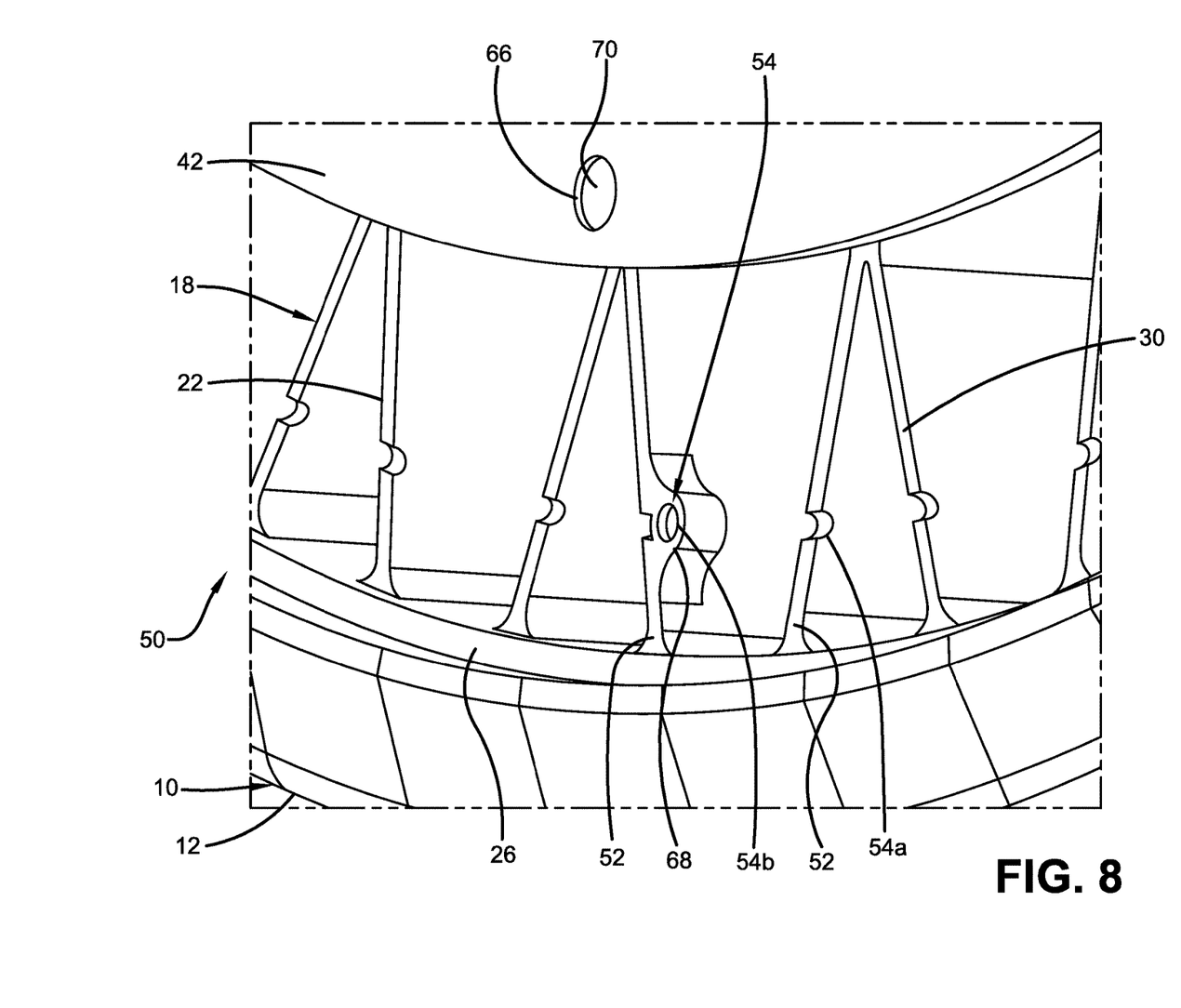
FIG. 8 is an enlarged fragmentary perspective view of an additional aspect of the system shown in FIG. 1.

Turning to FIG. 8, the system 10 may incorporate a sensor-based indicator. For example, the indicating means 54 for a sensor-based indicator may include a proximity sensor or a magnet 54b for a magnetic sensor 70. A boss structure 68 may be formed on or adjacent the outboard surface 52 of a selected one of the spokes 22 radially outwardly of the flange 42, and the magnet 54b preferably is disposed in the boss structure. The magnetic sensor 70 is shown by way of example, and is preferably mounted to the flange 42, which may be formed with an opening 66 for receiving the sensor. In a manner similar that as described above, when the tire 10 is overloaded or nearing the end of its life, the radial distance 60 is eliminated, so that the flange 42 and the magnetic sensor 70 enter into axial proximity with the magnet 54b.

When the magnetic sensor 70 enters into proximity with the magnet 54b, the sensor preferably generates an alert. In this manner, when the tire is overloaded 10, the vehicle on which the tire is installed can be unloaded until the sensor 70 is no longer in close proximity with the magnet 54b, thereby returning the tire to a proper loading state and causing the alert generated by the sensor to cease. When the tire 10 is nearing the end of its useful life and the alert is generated, the tire can be replaced.

The sensor 70 may be electronically connected to a monitoring or control system of the vehicle on which the tire 10 is mounted, such as a system that operates similar to tire pressure monitoring system for pneumatic tires, thereby enabling the alert to be sent to the operator of the vehicle. In addition, the sensor 70 may be remotely monitored by an electronic monitoring or management system, thereby alerting a fleet manager that the tire 10 is in an overloaded state or needs to be replaced.

In this manner, the system for detection of non-pneumatic tire loading 50 detects loading of a non-pneumatic tire 10 to determine if the tire is overloaded, and thus needs the vehicle load to be reduced, or is nearing the end of its useful life, and thus is in need of replacement. The system 50 includes a flange 42 disposed on an outboard surface 52 of the spokes of an outboard spoke disk 18, which interfaces with indicating means 54 that are formed on the outboard surface of selected spokes radially outwardly of the flange.

The indicating means 54 may include visual means, such as a notch 54*a* or a colored dot, which provide a visual indicator when the tire 10 is in an overloaded state or is nearing the end of its useful life. Alternatively, the indicating means 54 may include audio means, such as a protrusion, which provides an audio signal when the tire 10 is in an overloaded state or is nearing the end of its useful life. The indicating means 54 may also include sensor means 54*b*, such as a proximity sensor or a magnet that interfaces with a magnetic sensor 70, which generates an alert when the tire 10 is in an overloaded state or is nearing the end of its useful life.

The present invention also includes a method of detecting loading of a non-pneumatic tire 10. The method includes steps in accordance with the description that is presented above and shown in FIGS. 1 through 8.

It is to be understood that the structure of the above-described system for detection of non-pneumatic tire loading 50 may be altered or rearranged, or components known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for detection of non-pneumatic tire loading, the system comprising:
    a non-pneumatic tire, the non-pneumatic tire including:
        a ground-contacting annular tread;
        a central rim;
        at least one spoke disk disposed between the rim and the tread, the at least one spoke disk including an inner ring mounted on the central rim, an outer ring, and a plurality of spokes extending radially between the inner ring and the outer ring; and
        a shear band disposed between the outer ring of the at least one spoke disk and the tread;
    a flange disposed on an outboard surface of the plurality of spokes of the at least one spoke disk; and
    indicating means formed on the outboard surface of the plurality of spokes of the at least one spoke disk radially outwardly of the flange, wherein the flange interfaces with the indicating means when the tire is in an overloaded state or is in need of replacement.

2. The system for detection of non-pneumatic tire loading of claim 1, wherein the at least one spoke disk includes a plurality of spoke disks, the flange is disposed on an outboard surface of the plurality of spokes of an outboard one of the spoke disks, and the indicating means are formed on the outboard surface of the plurality of spokes of the outboard one of the spoke disks.

3. The system for detection of non-pneumatic tire loading of claim 1, wherein a radial distance is formed between the indicating means and a respective point along a perimeter of the flange, and when the tire is overloaded or is in need of replacement, the radial distance is eliminated.

4. The system for detection of non-pneumatic tire loading of claim 1, wherein the indicating means include visual means, which provide a visual indicator when the tire is in an overloaded state or is in need of replacement.

5. The system for detection of non-pneumatic tire loading of claim 4, wherein the visual means includes a notch formed on the outboard surface of selected spokes, and the notch is covered by the flange when the tire is in an overloaded state or is in need of replacement.

6. The system for detection of non-pneumatic tire loading of claim 4, wherein the visual means includes a protrusion formed on the outboard surface of selected spokes, and the protrusion is covered by the flange when the tire is in an overloaded state or is in need of replacement.

7. The system for detection of non-pneumatic tire loading of claim 4, wherein the visual means includes a dot formed on the outboard surface of selected spokes, and the dot is covered by the flange when the tire is in an overloaded state or is in need of replacement.

8. The system for detection of non-pneumatic tire loading of claim 1, wherein the indicating means include audio means, which provide an audio signal when the tire is in an overloaded state or is in need of replacement.

9. The system for detection of non-pneumatic tire loading of claim 8, wherein the audio means includes a protrusion formed on the outboard surface of selected spokes, and the protrusion contacts the flange to emit a sound when the tire is in an overloaded state or is in need of replacement.

10. The system for detection of non-pneumatic tire loading of claim 1, wherein the indicating means include sensor means, which generate an alert when the tire is in an overloaded state or is in need of replacement.

11. The system for detection of non-pneumatic tire loading of claim 10, wherein the sensor means includes a proximity sensor.

12. The system for detection of non-pneumatic tire loading of claim 10, wherein the sensor means includes a magnet, which comes into proximity with a magnetic sensor to generate the alert when the tire is in an overloaded state or is in need of replacement.

13. The system for detection of non-pneumatic tire loading of claim 12, wherein the magnetic sensor is electronically connected to a monitoring or control system of the vehicle on which the tire is mounted.

* * * * *